(12) United States Patent
Abeles

(10) Patent No.: US 12,550,810 B2
(45) Date of Patent: Feb. 17, 2026

(54) GROUND PENETRATING SELF-DRILLING SEED PLANTING DEVICE

(71) Applicant: VIRIDIS ARBOR LLC, Verona, NJ (US)

(72) Inventor: Gary E. Abeles, Verona, NJ (US)

(73) Assignee: VIRIDIS ARBOR LLC, Verona, NJ (US)

(*) Notice: Subject to any disclaimer, the term of this patent is extended or adjusted under 35 U.S.C. 154(b) by 0 days.

(21) Appl. No.: 19/222,429

(22) Filed: May 29, 2025

(65) Prior Publication Data

US 2025/0380628 A1    Dec. 18, 2025

Related U.S. Application Data

(60) Provisional application No. 63/660,780, filed on Jun. 17, 2024.

(51) Int. Cl.
*A01C 7/20* (2006.01)
*A01C 21/00* (2006.01)

(52) U.S. Cl.
CPC ............... *A01C 7/20* (2013.01); *A01C 21/00* (2013.01)

(58) Field of Classification Search
CPC .............. A01C 7/20; A01C 7/00; A01C 21/00
See application file for complete search history.

(56) References Cited

U.S. PATENT DOCUMENTS

| | | |
|---|---|---|
| 2,394,192 A | 2/1946 | Mann |
| 4,031,832 A | 6/1977 | Edwards |
| 4,333,265 A | 6/1982 | Arnold |
| 8,341,882 B2 | 1/2013 | Weder |
| 11,633,881 B1 * | 4/2023 | Christy ............... B29C 33/3828 264/425 |

(Continued)

FOREIGN PATENT DOCUMENTS

| | | |
|---|---|---|
| JP | 6768746 B2 | 10/2020 |
| KR | 1020140068414 A | 6/2014 |

OTHER PUBLICATIONS

Spice, Byron. "Engineered Magic: Wooden Seed Carriers Mimic the Behavior of Self-Burying Seeds", [Carnegie Mellon University], [Retrieved on May 30, 2024]. Retrieved from the Internet URL: https://www.cs.cmu.edu/news/2023/engineered-magic >.

(Continued)

*Primary Examiner* — Christopher J. Novosad
(74) *Attorney, Agent, or Firm* — Maine Cernota & Curran

(57) ABSTRACT

A seed planting device includes a tapered projectile containing a seed carrier that includes a helix made from a material that expands when exposed to moisture. At least one seed, seedling, and/or sapling is fixed to the lower end of the helix. The projectile is dropped or ballistically propelled downward from an aircraft, such that the bottom of the projectile penetrates into the ground. Water enters the projectile, causing the helix to uncoil and extend downward through the projectile bottom, implanting the seed in underlying soil. The projectile bottom can be open, or capped with a hard, water-soluble material. The top of the projectile can be open, holes can be provided on a projectile side, and/or water in a frangible container can be provided within the projectile. The seed carrier top can be prevented from upward movement within the projectile. The projectile can include anchoring barbs.

20 Claims, 12 Drawing Sheets

(56) References Cited

U.S. PATENT DOCUMENTS

2018/0043642 A1\* 2/2018 Miller .................... B29C 70/54
2019/0116719 A1   4/2019 Fletcher
2021/0092909 A1   4/2021 Doyle

OTHER PUBLICATIONS

International Search Report and Written Opinion for PCT Appl. No. PCT/US2022/042322, 9 pages.
International Preliminary Report on Patentability for International Application No. PCT/US2022/042322 mail date May 10, 2024, 6 pages.
Office Action for U.S. Appl. No. 18/700,343, mail date Mar. 24, 2025, 32 pages.
Final Office Action for U.S. Appl. No. 18/700,343 mail date May 2, 2025, 32 pages.

\* cited by examiner

GROUND PENETRATING SELF-DRILLING SEED PLANTING DEVICE

RELATED APPLICATIONS

This application claims the benefit of U.S. Provisional Application No. 63/660,780, filed Jun. 17, 2024, which is herein incorporated by reference in its entirety for all purposes.

FIELD OF THE INVENTION

The invention relates to application of seeds and/or seedlings to a forest or other remote area that has been damaged by fire, drought, logging, pestilence, invasive species, or other causes, and more particularly, to aerial insertion of seeds and seedlings into remote forests and other remote wilderness areas that have been damaged.

BACKGROUND OF THE INVENTION

Ecological recovery of a damaged wilderness area has always been challenging, especially in areas that are unpopulated, or only sparsely populated. Furthermore, recent trends in global climate change have resulted in consistently higher temperatures and persistent droughts in many areas, which in turn have increased the risks and the occurrences of major fires in wilderness and other sparsely populated areas. In particular, fifteen of the largest wildfires that have ever been recorded in the United States have occurred within the past ten years. In addition, there has been a significant rise in damage to wilderness vegetation due to disease, insect infestation, invasive species, and other causes. And, of course, forests have long been under attack by the logging industry.

Direct aerial seeding can be a practical, low cost, and responsive approach to restoring large, remote treatment areas. Seeds or seedlings can be deposited onto the remote area using airplanes, helicopters, balloons, or unmanned aerial vehicles (UAVs), sometimes referred to as "drones." Bare seeds can simply be dropped onto an area, or the seeds can be encapsulated into pods that also contain nutrients and water to help the seeds germinate. In some cases, germinated seedlings or saplings are dropped instead of seeds. It will be noted that all of the above are generically referred to herein simply as "seeds," unless otherwise stated or required by a specific context.

Unfortunately, after the seeds land on the ground, it may be difficult for them to germinate if the underlying soil is compacted or covered with ashes, invasive vegetation, or some other undesirable layer. For example, if the seeds are being dropped onto an area that has been damaged by fire, it can be almost impossible for the roots of germinated seedlings to reach underlying fertile soil and water.

With reference to FIG. 1A, during intense forest fires, a waxy substance derived from the burning plant material is formed. Initially created as a gas, this substance penetrates into the topsoil and then hardens, creating what is called a "hydrophobic layer" 102 above the underlying layer of normal soil 104. This hydrophobic layer 102 can be up to three inches thick, and is the main source of mudslides in regions that have experienced a forest fire, because it prevents rainwater from sinking into the ground and reaching the underlying soil 104 that would otherwise be able to absorb the water. A thin layer of ash 100 may be formed on top of the hydrophobic layer 102, but is insufficient for supporting new seedlings, and may simply be washed away by subsequent rains and mudslides.

In the aftermath of a forest fire, the roots of the new vegetation 106 that results from seeds dropped onto the burned-over ground have difficulty penetrating through the hard hydrophobic layer 102, which means that, typically, the roots will be mainly on the surface of the ground above the hydrophobic layer 102. Most of the new vegetation 106 will therefore be poorly anchored to the ground and easily washed away.

As a result, huge volumes of seeds can be required to restore vegetation to a remote area at scale. Estimates suggest that reforesting around 25 million acres of lost and degraded forest in the western U.S. would require between 8 billion and 45 billion seeds. Accordingly, the availability of seeds can significantly limit the ability to restore a damaged wilderness area, and seed-use efficiency is tantamount to sustainable land-management practices.

With reference to FIG. 1B, one approach that is disclosed in U.S. patent application Ser. No. 18/700,343, also by the present inventor and incorporated herein by reference in its entirety for all purposes, is to encapsulate the seeds 108 within pointed or otherwise tapered projectiles 110, possibly together with soil, water, and nutrients 112, and then drop or propel the projectiles 110 onto the damaged wilderness with sufficient kinetic energy to break through the hydrophobic layer 102 and/or other unfavorable layers covering the underlying soil. Nevertheless, it can be difficult to impart sufficient kinetic energy to the tapered projectiles to enable them to fully penetrate through the hydrophobic layer, especially if the soil is dry, compacted, and/or sandy.

With reference to FIG. 1C, another approach, which was recently introduced by researchers at Carnegie Mellon University, is to attach the seeds to or within the lower ends of autonomous, self-burying seed carriers 114, which emulate the action of Erodium seed carriers by self-drilling into the underlying soil. These "self-drilling" seed carriers 114 comprise dehydrated, tightly wound, tapered helixes 116 made from a material, such as white oak, that expands when it absorbs water. Each seed carrier 114 is topped with a spiral 118 having a much larger diameter, which helps to incline the tip of the helix 116 at an angle toward the ground. FIGS. 1D and 1E compare the lengths of the helix 116 in its dehydrated, tightly wound state 114A and its hydrated, unwound state 114B.

The strength and penetrating power of the helix can be increased by combining a plurality of "sub-helices" in parallel. For example, FIG. 1F is a perspective view of a self-drilling seed carrier 120 that includes a triple helix 122 and spiral 124. FIGS. 1G and 1H compare the lengths of the helix 122 in its dehydrated, tightly wound state 120A and its hydrated, unwound state 120B.

This self-drilling approach can be effective in penetrating soft soil. Otherwise, it can be difficult for the drilling process to be initiated, unless the tip of the seed carrier 114 fortuitously lands in a natural indentation or crevasse that can serve as a "pilot hole" for the expanding, rotating helix 116. Otherwise, if the ground is difficult to penetrate, or if the ground is covered by a hydrophobic layer 102, the expanding helix 116 will simply push the spiral 118 away from the ground, rather than drilling itself into the ground. As a result, these self-burying seed carriers often have a low success rate when applied under unfavorable conditions, such as after a forest fire.

It should be noted that, for ease of expression, the term "forest" is used generically herein to refer to any vegetated area that is a wilderness area, an otherwise unpopulated area, or a sparsely populated area, whether or not the vegetation is primarily trees, and the term "forest fire" is used generically herein to refer to any source of damage to a heavily vegetated area, including not only fire but also drought, disease, insect infestation, etc. The terms "trees" and "ground cover" are used herein to refer to any type of vegetation that is relatively large and relatively small, respectively. And the terms "seed" and "seeds" are used to refer to individual seed, seedlings, and saplings, as well as seeds, seedlings, or saplings packaged in a container or "pod," possibly together with nutrients and/or other support materials.

What is needed, therefore, is an apparatus and method for increasing the yield of seeds or seedlings that are aerially deposited onto a remote area.

SUMMARY OF THE INVENTION

The present invention is an apparatus and method for increasing the yield of seeds or seedlings that are aerially deposited onto a remote area.

According to the present invention, a self-drilling seed carrier is positioned within a tapered projectile having a tip that is either open, or terminated by a water-soluble, pointed cap. The top of the seed carrier is either fixed to the projectile, or otherwise prevented by internal structure from moving upward within the projectile.

Upon striking the ground, the projectile impacts in a substantially vertical orientation and penetrates into the underlying surface sufficiently far to anchor the projectile to the ground, while providing a "pilot hole" for the seed carrier. The seed carrier is thereby able to initiate its drilling action, even if the ground is hard-packed or otherwise difficult to penetrate. If a hydrophobic layer is present, the projectile penetrates through the hydrophobic layer into the underlying soil, allowing the seed carrier to drill into the soil below the hydrophobic layer. As the interior of the projectile is exposed to water, the cap at the tip of the projectile, if present, is dissolved, and the helix of the seed carrier expands, twisting and drilling itself further and deeper into the underlying layers.

Embodiments provide various mechanisms for hydration of the interior of the projectile. In embodiments, water enters the projectile through an open top thereof. Some embodiments include side openings through which ground water can easily penetrate. And certain embodiments include a reservoir of water enclosed within the projectile in a frangible hydration container that releases its contents onto the seed carrier upon impact of the tapered projectile with the ground.

While the top of the seed carrier is illustrated and sometimes referred to herein as being a "spiral," it will be understood that the functionality of the seed carrier arises primarily from its helix, and not from its top, and that the top of the seed carrier can be an annulus, a disk, or any other construction that can be restrained from moving upward through the projectile. Similarly, the projectile is illustrated and sometimes referred to herein as a "cone." However, it will be understood that the projectile can take on any tapered shape, such as an inverted pyramid, and need not be conical.

One general aspect of the present invention is a seed planting device that includes a hollow tapered projectile having a top, a bottom, and a side, wherein a horizontal, cross-sectional area of the top is larger than a horizontal, cross-sectional area of the bottom, a seed carrier positioned within an interior of the tapered projectile, the seed carrier comprising a helix extending downward from a carrier top of the seed carrier, the helix being substantially aligned with a central axis of the tapered projectile, the helix being made from a material that expands when exposed to water, thereby at least partially unwinding the helix and increasing a length thereof, and one or more seeds, seedlings, and/or saplings contained within the tapered projectile and fixed to, or within, a lower portion of the helix. The seed planning device is configured such that, upon an impact of the tapered projectile with underlying ground, the bottom of the tapered projectile is inserted into the ground, and the helix is exposed to moisture, thereby causing the length of the helix to be increased, such that the helix extends downward through the bottom of the tapered projectile, and the one or more seeds, seedlings, and/or saplings are inserted into soil beneath the tapered projectile.

In embodiments, the carrier top extends laterally beyond a diameter of the helix.

In any of the above embodiments, the carrier top can comprise at least one spiral.

In any of the above embodiments, the helix can comprise a plurality of parallel sub-helices that are spaced vertically apart and wound together to form the helix.

In any of the above embodiments, the tapered projectile can be shaped as a cone, or as a frustum of a cone.

In any of the above embodiments, the carrier top can be prevented from moving upward within the interior of the tapered projectile. In some of these embodiments, the carrier top is fixed to the interior of the tapered projectile. In any of these embodiments, the interior of the tapered projectile can comprise a structure that blocks the carrier top from moving upward within the interior of the tapered projectile.

In any of the above embodiments, the bottom of the tapered projectile can comprise a downward-facing opening through which the helix is able to extend as its length is increased. Or the bottom of the tapered projectile can be a downwardly directed cap made from a water-soluble material. In some of these embodiments, the water-soluble material comprises at least one of carbon nano-tube reinforced poly-vinyl alcohol and fiberglass reinforced acrylic.

In any of the above embodiments, the tapered projectile can comprise at least one opening that penetrates the side of the tapered projectile, thereby enabling moisture proximate the side of the tapered projectile to enter into the interior of the tapered projectile.

In any of the above embodiments, the tapered projectile can further comprise water enclosed within a hydration container within the interior of the tapered projectile, the hydration container being configured to release the water onto the helix upon impact of the tapered projectile with the ground. In some of these embodiments, the hydration container is frangible, and configured to be broken open upon impact of the tapered projectile with the ground. And in some of these embodiments, the tapered projectile further comprises a hammer configured to strike and break open the hydration container upon impact of the tapered projectile with the ground.

Any of the preceding embodiments can include at least one anchor extending outward from the tapered projectile, the anchor being configured to readily penetrate into the ground, and thereafter to resist any upward dislodging of the tapered projectile from the ground. In some of these embodiments, the at least one anchor is a barb having a width thereof that is smaller than a length thereof, wherein the barb extends obliquely upward from the tapered projectile. And in some of these embodiments the barb is a strip of material cut from the side of the tapered projectile and bent outward therefrom.

Any of the above embodiments can further include at least one of nutrients, soil, sand, gravel, fertilizer, and superabsorbent polymer (SAP) within the interior of the tapered projectile.

In any of the above embodiments, the seed carrier can be made from a biodegradable material. In some of these embodiments, the tapered projectile can be made at least partly from coir.

A second general aspect of the present invention is a method of aerially applying seeds and/or seedlings to ground within a terrain. The method includes providing a seed planting device according to any preceding claim, and dropping or propelling the seed planting device from an aircraft toward the ground, such that the bottom of the tapered projectile of the seed planting device impacts the ground according to an impact energy, the bottom of the tapered projectile of the seed planting device penetrates into the ground, the helix of the seed carrier positioned within the tapered projectile is exposed to moisture, the length of the helix is increased, the helix extends downward through the bottom of the tapered projectile, and the one or more seeds, seedlings, and/or saplings that are fixed to or within a lower portion of the helix are inserted into soil beneath the tapered projectile.

In embodiments, the aircraft is one of an airplane, a helicopter, a balloon, and an unmanned aerial vehicle (UAV).

In any of the above embodiments, the impact energy of the seed planting device can be derived entirely from gravitational acceleration after being released from the aircraft. Or dropping or propelling the seed planting device from the aircraft can include ballistically propelling the seed planting device from the aircraft toward the forest floor. In some of these embodiments, the seed planting device is ballistically propelled by at least one of a compressed gas and a chemical explosive.

And in any of the above embodiments, the impact energy can be sufficient to cause the tapered projectile to penetrate a hydrophobic layer into underlying soil.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for increasing the yield of seeds or seedlings that are aerially deposited onto a remote area.

Figure 1A:
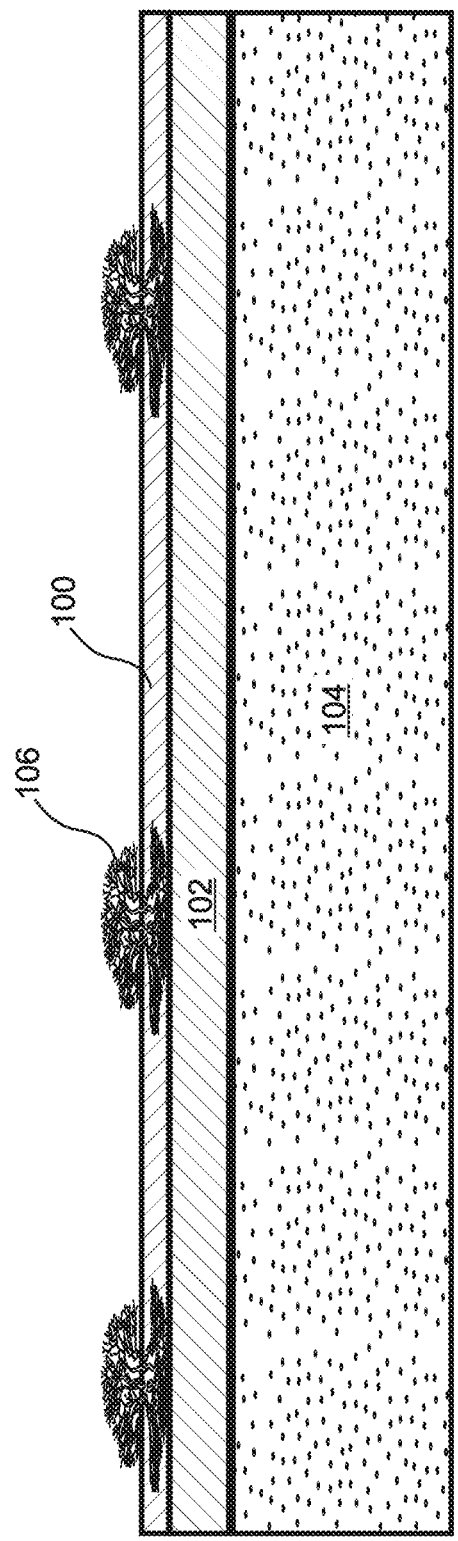
FIG. 1A is a cross-sectional view illustrating a layer of ash and newly germinated vegetation on top of an underlying hydrophobic layer according to the prior art.
Figure 1B:
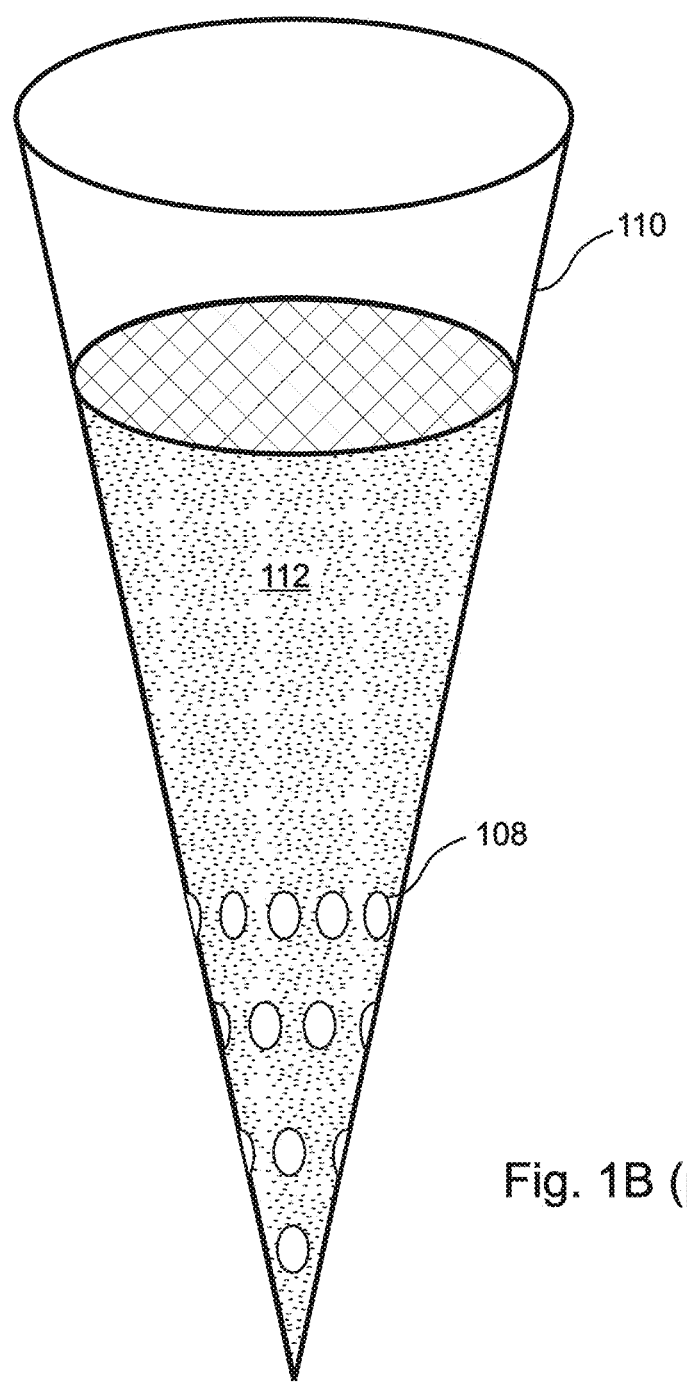
FIG. 1B is a perspective view of seeds contained together with soil and nutrients within a tampered container according to the prior art.
Figure 1C:
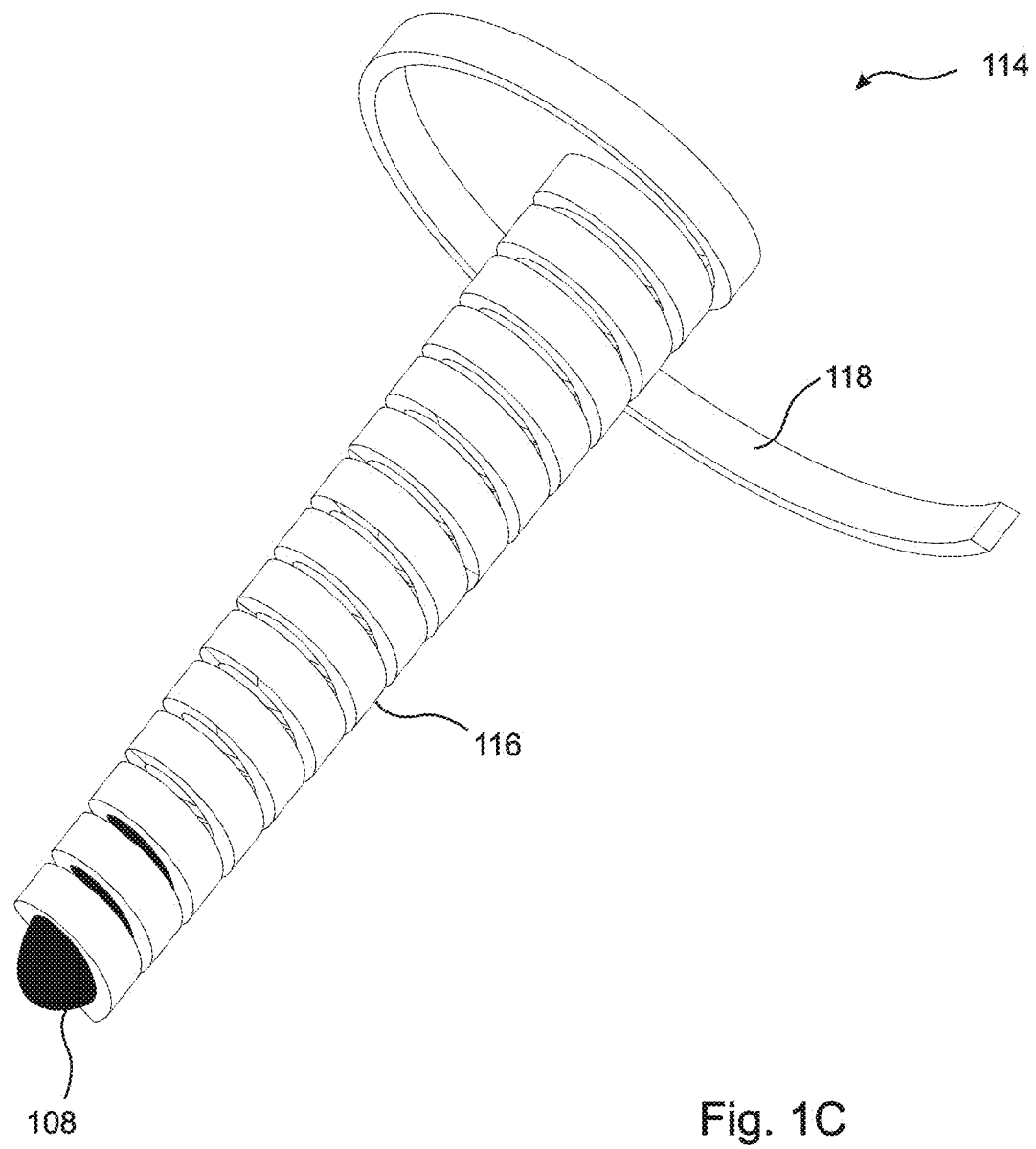
FIG. 1C is a perspective view of a self-drilling seed carrier of the prior art comprising a single helix shown in its dehydrated state.
Figure 1D:
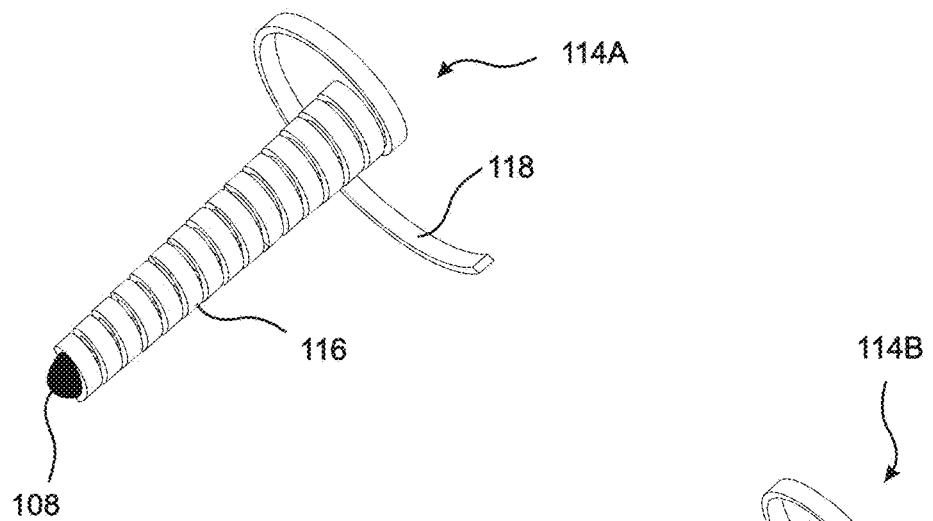
FIG. 1D is a smaller rendering o FIG. 1C for comparison purposes.
Figure 1E:
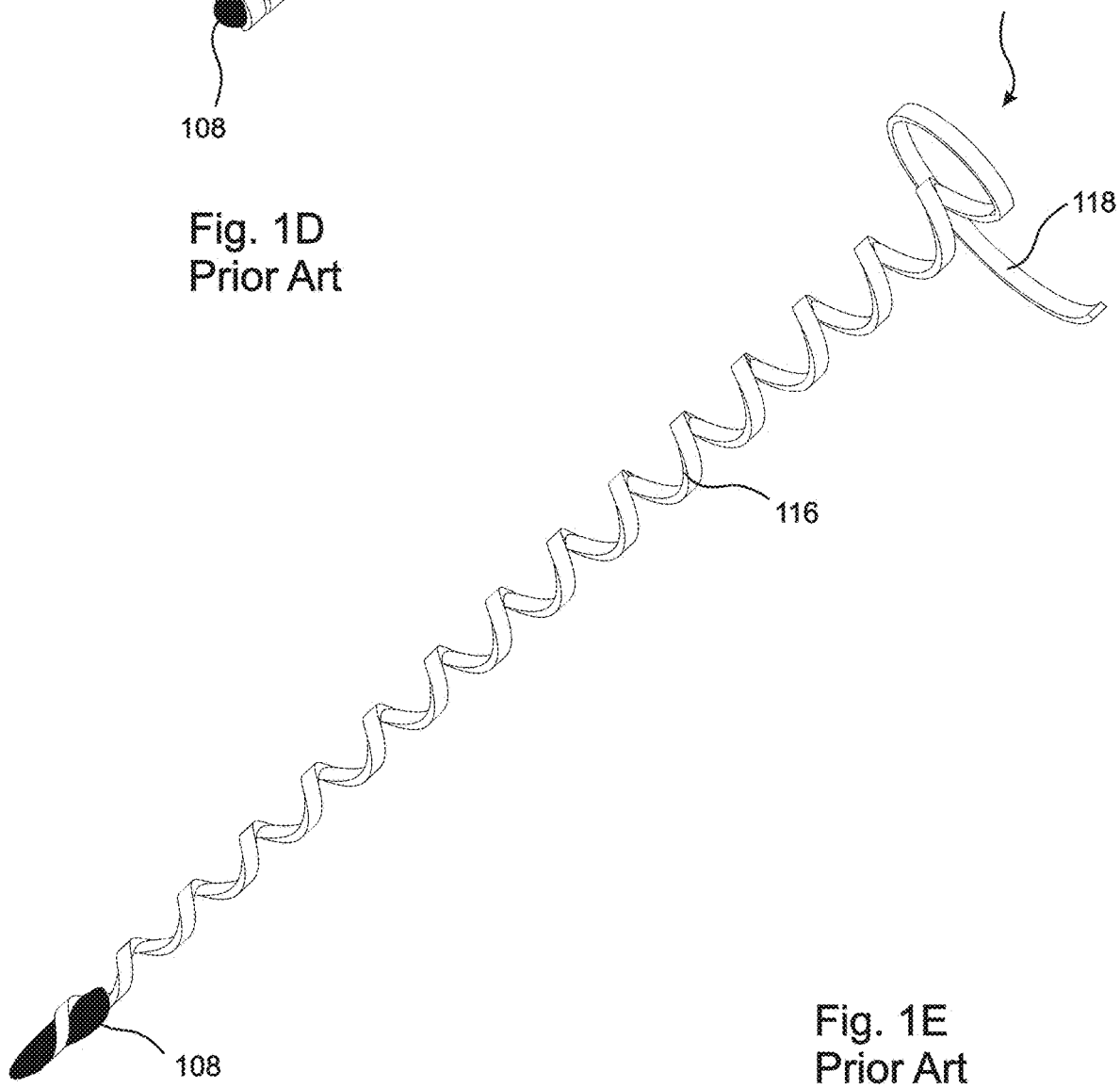
FIG. 1E is a perspective view of the seed carrier of FIG. 1D shown after exposure thereof to moisture.
Figure 1F:
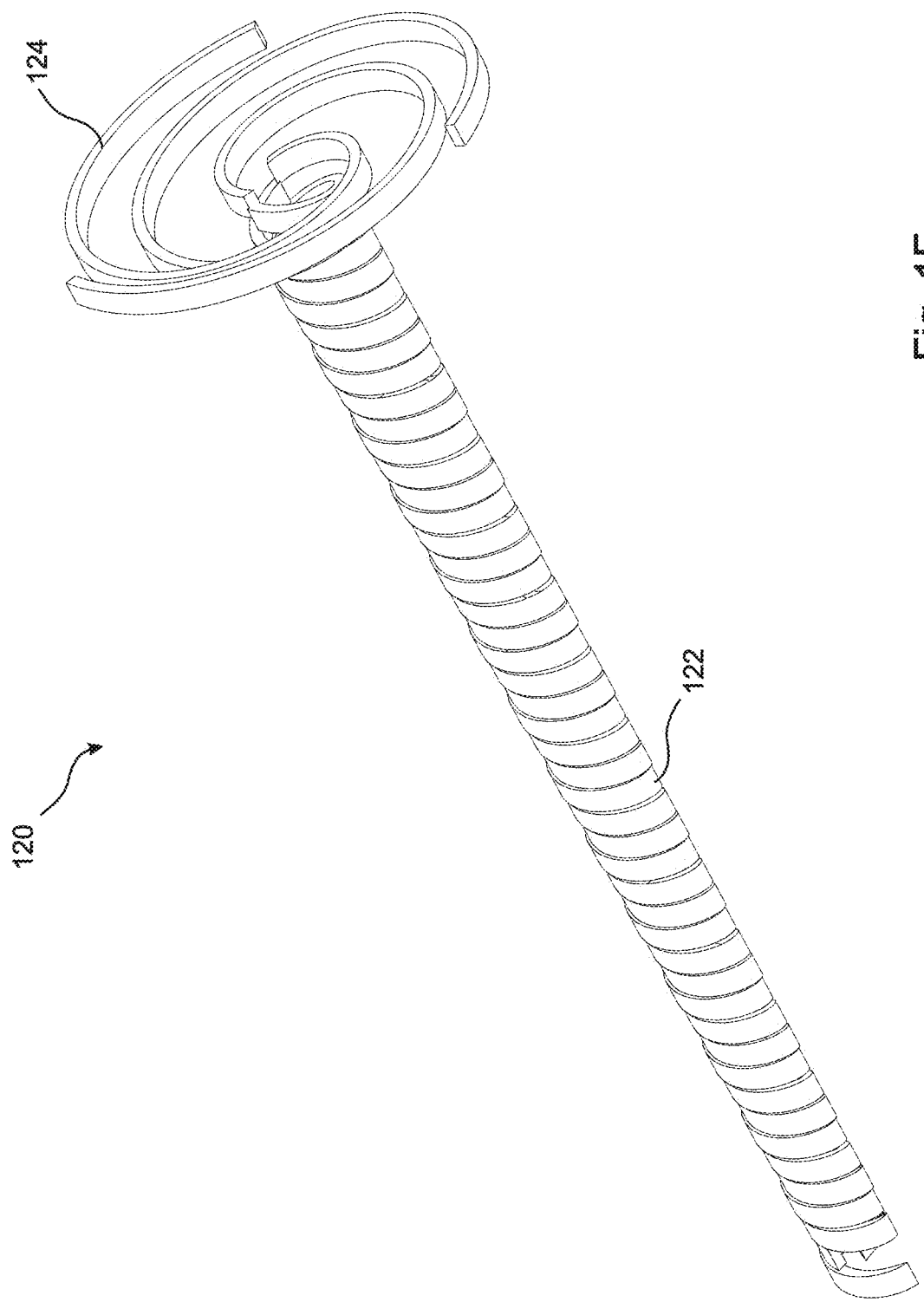
FIG. 1F is a perspective view of a self-drilling seed carrier of the prior art comprising a triple helix shown in its dehydrated state.
Figure 1G:
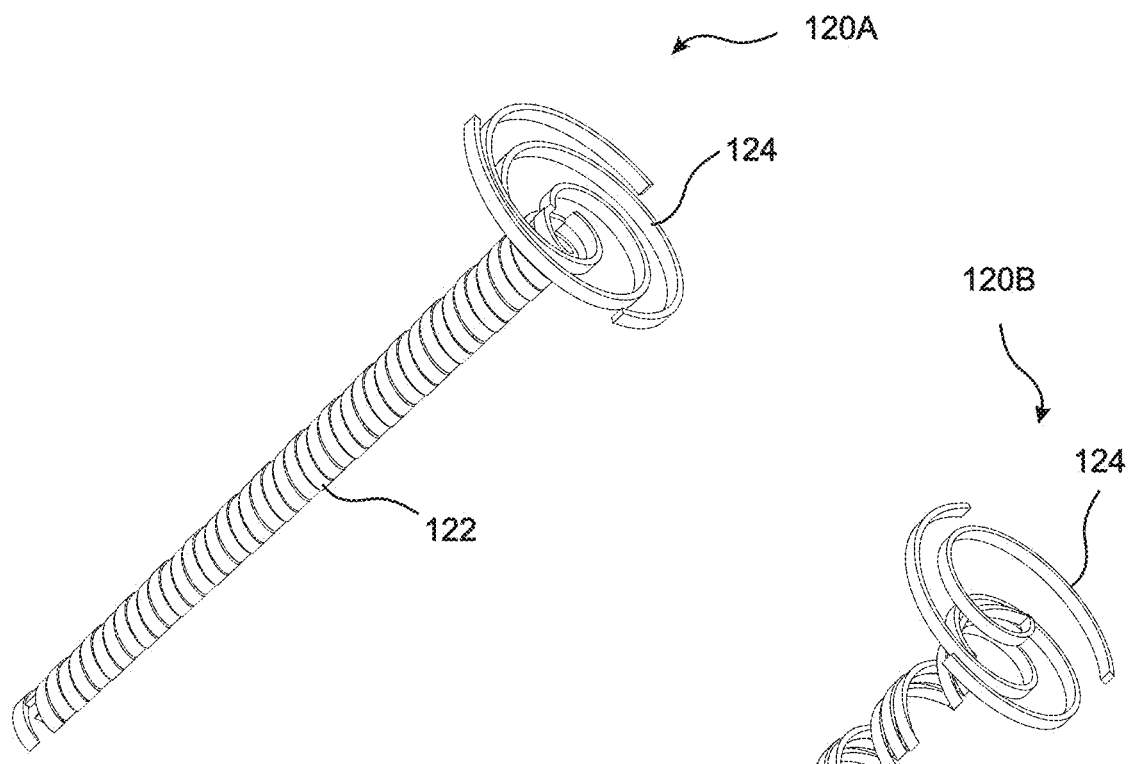
FIG. 1G is a smaller rendering o FIG. 1F for comparison purposes.
Figure 1H:
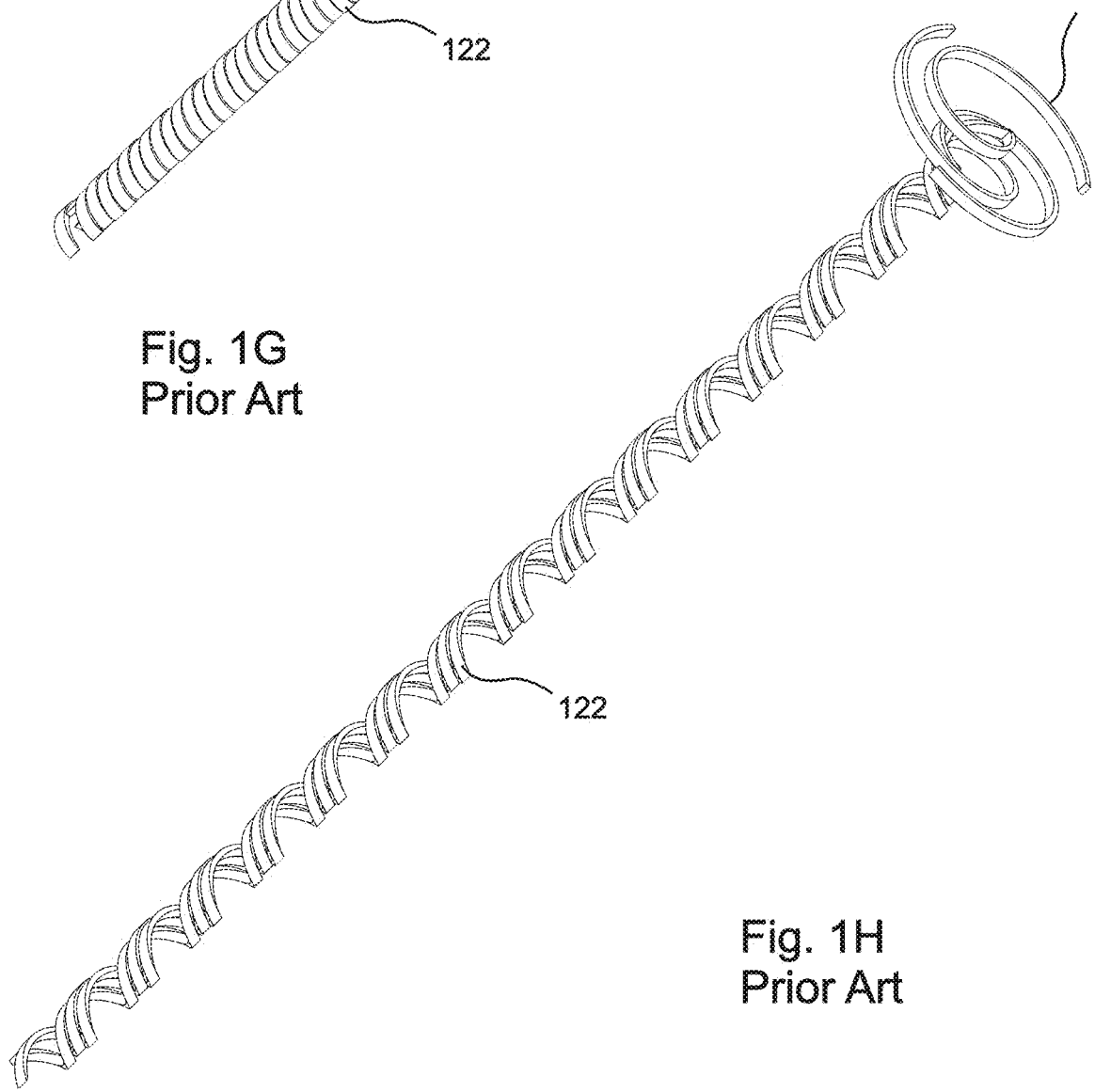
FIG. 1H is a perspective view of the seed carrier of FIG. 1G shown after exposure thereof to moisture.
Figure 2:
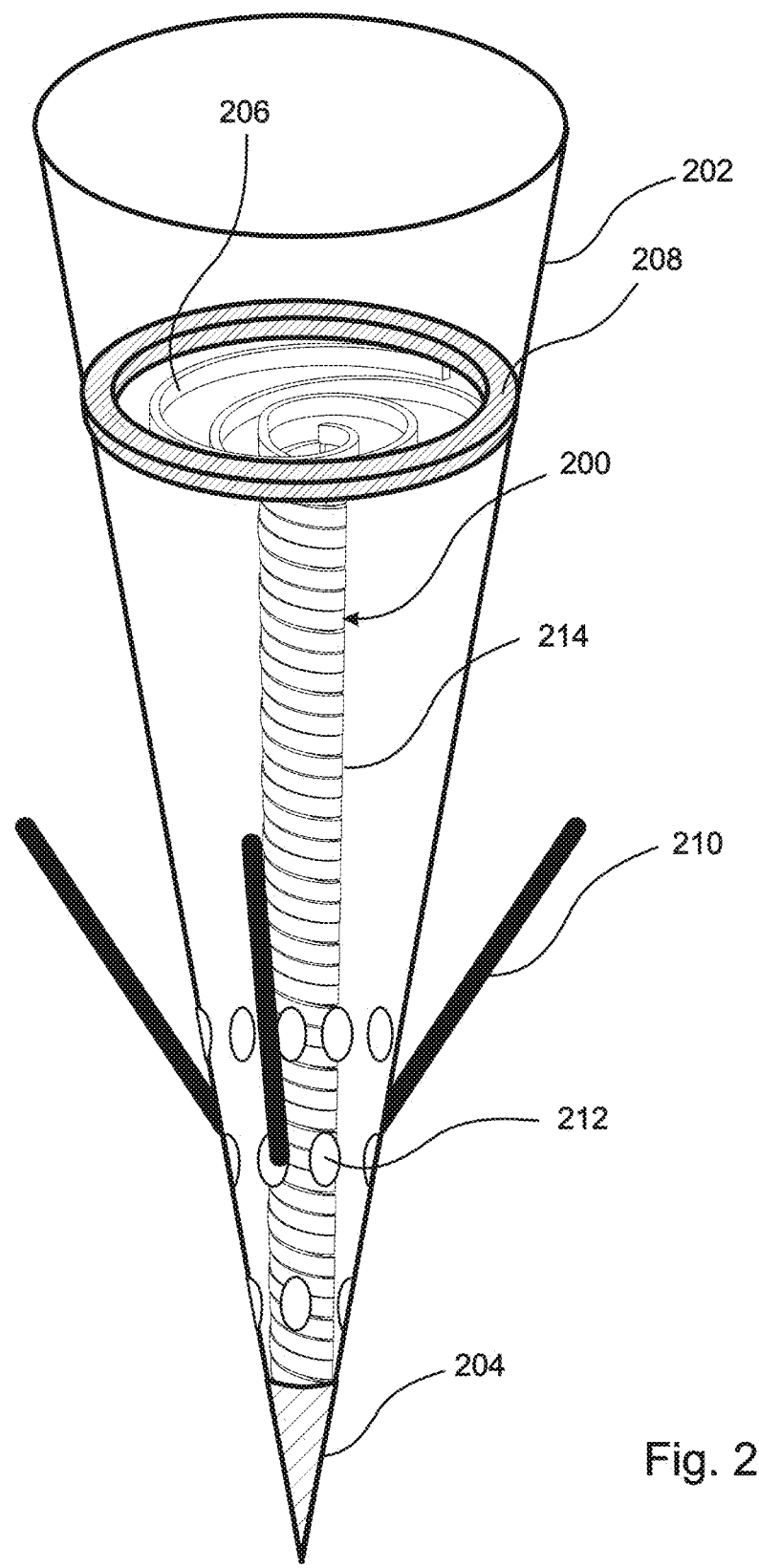
FIG. 2 is a perspective view of an embodiment of the present invention.

With reference to the perspective side view of FIG. 2, a self-drilling seed carrier 200 comprising a dehydrated and tightly wound helix 214 is positioned within a tapered projectile 202 having a tip that is either open, or terminated by a water-soluble, pointed cap 204. If a water-soluble, pointed cap 204 is included, it can be made, for example, from carbon nano-tube reinforced poly-vinyl alcohol, and/or fiberglass reinforced acrylic. In some embodiments, the projectile 202 is made from a biodegradable material, such as coir, thereby minimizing any long-term impact on the environment. Note that the wall of the projectile 202 has been rendered transparent, so that the interior contents can be seen.

The top 206 of the seed carrier 200 is either fixed to the projectile 202, or otherwise prevented by internal structure from moving upward within the projectile 202. In the illustrated embodiment, a containing ring 208 is threaded or otherwise fixed to the projectile 202 immediately above a spiral top 206 of the seed carrier 200, thereby preventing the spiral top 206 from being pushed upward within the projectile 202.

Figure 3:
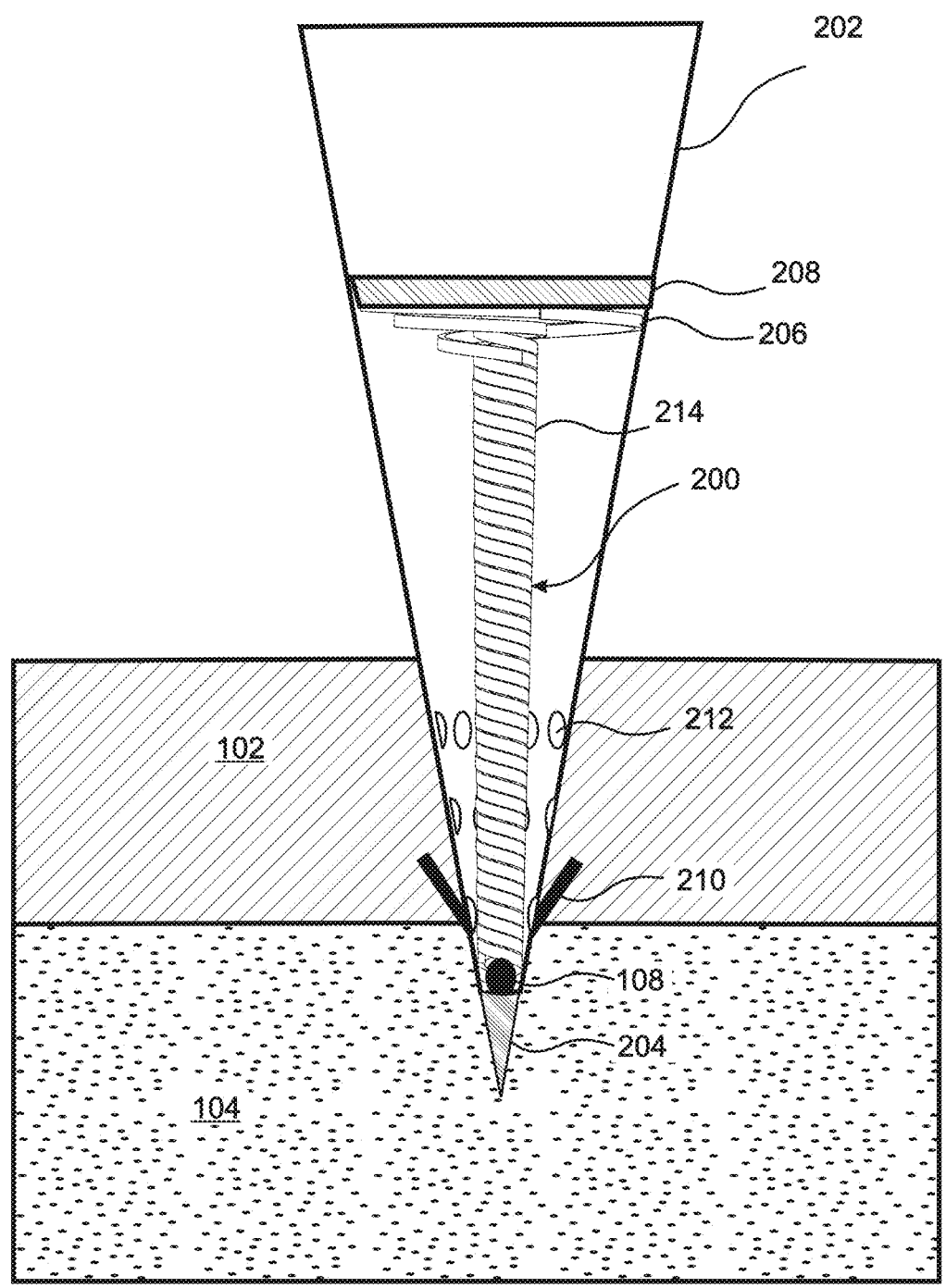
FIG. 3 is a side view of the embodiment of FIG. 2, shown penetrating through a hydrophobic layer of a terrain immediately after impact therewith.

In the embodiment of FIG. 2 the projectile 202 comprises a plurality of anchor barbs 210 that extend outward from the projectile 202 near its tip 204, and resist being pushed upward once they have penetrated into the ground, as shown in FIG. 3. In some embodiments, the anchor barbs 210 are separate elements that are attached to the side of the projectile 202, or extend outward from within through holes provided in the side of the projectile 202. In still other embodiments, the anchor barbs 210 are strips of projectile material that are cut out of the side of the projectile 202 and bent outward.

With continuing reference to the sectional view of FIG. 3, the projectile 202 impacts the ground 102, 104 in a substantially vertical orientation, and penetrates into the underlying surface 102 sufficiently far to anchor the projectile 202 to the ground 102, 104, such that it remains vertical. A "pilot hole" is thereby provided for the seed carrier, even if the ground is hard-packed or otherwise difficult to penetrate. As is illustrated in FIG. 3, if a hydrophobic layer 102 is present, the projectile 202 penetrates through the hydrophobic layer 102 into the underlying soil 104. In the illustrated embodiment, the projectile 202 includes a water-soluble cap 204, that, upon dissolving, provides an opening through which the helix 214 of the self-drilling seed carrier 200 can extend upon exposure to moisture.

Embodiments provide various mechanisms for hydration of the helix 214 within the tapered projectile 202 once it is anchored in the ground 102, 104. In some embodiments, water enters the projectile 202 through an open top thereof. In other embodiments, the projectile 202 includes side openings 212 through which ground water can easily penetrate into the projectile 202. As is discussed in more detail below with reference to FIG. 6, certain embodiments include a reservoir of water that is preinstalled in the projectile 202 and enclosed within a hydration frangible container that releases its contents onto the seed carrier 200 upon impact of the projectile 202 with the ground 102, 104.

Figure 4:
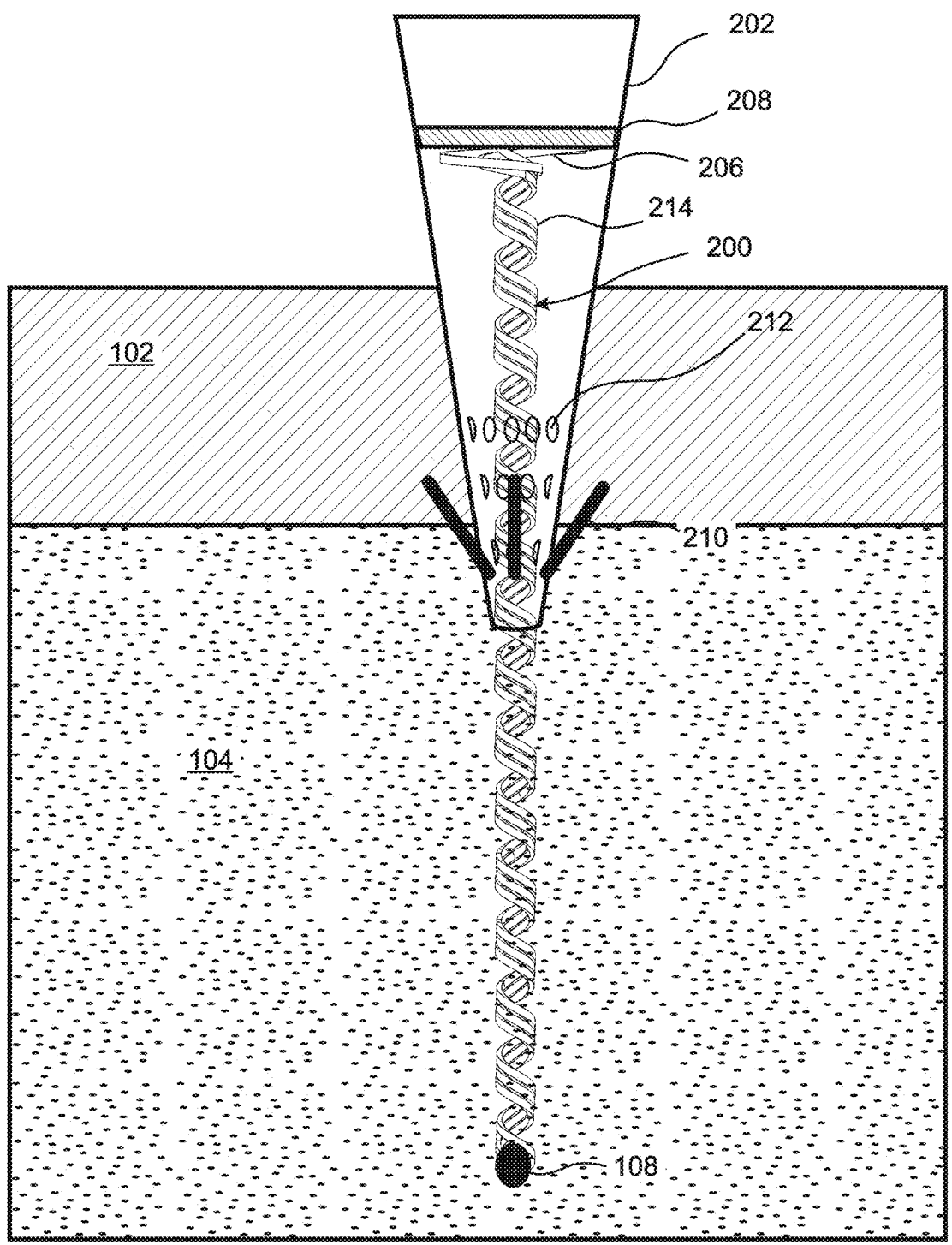
FIG. 4 is a side view of the embodiment of FIG. 3 shown after exposure of the seed carrier helix to moisture.

With reference to FIG. 4, as the seed carrier 200 within the interior of the projectile 202 is exposed to water, and the pointed cap 204 (if present) at the bottom of the projectile is dissolved, the helix 214 of the seed carrier 200 expands, twisting and drilling itself further and deeper into the underlying layers 102, 104. It will be noted that, in the example of FIG. 3, the tapered projectile 202 has penetrated entirely through the hydrophobic layer 102, allowing the helix 214 and the seed 108 attached thereto to penetrate into the underlying soil 104.

Figure 5:
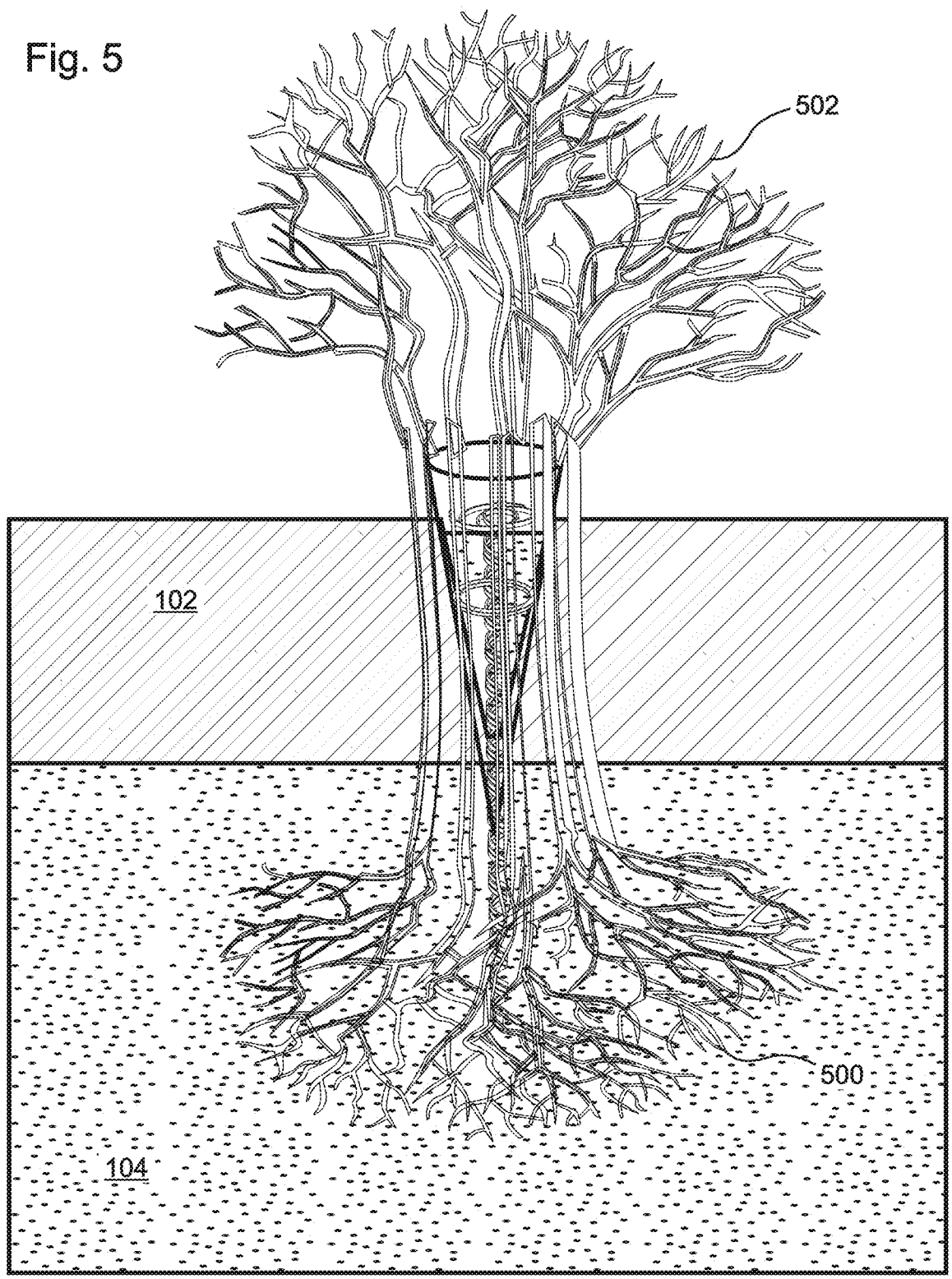
FIG. 5 is a side view of vegetation that has germinated from the seed of FIG. 4 and grown upward to become new vegetation.

As a result, with reference to FIG. 5, the seed 108 is able to germinate in the undamaged lower soil 104, where it establishes a root system 500 that enables the new vegetation 502 to grow upward, breaking through the hydrophobic layer 102. Initially, the projectile 202 may be surrounded by the growing vegetation 502, as shown in the figure. However, in embodiments where the projectile 202 is made from a biodegradable material, such as coir, it will eventually break down and be absorbed into the vegetation 502, and/or will generally be incorporated into the environment. Similarly, in embodiments, the self-burying seed carrier 200 will be made from white oak, or from a similar biodegradable material, and will eventually be absorbed without harm to the environment.

Figure 6:
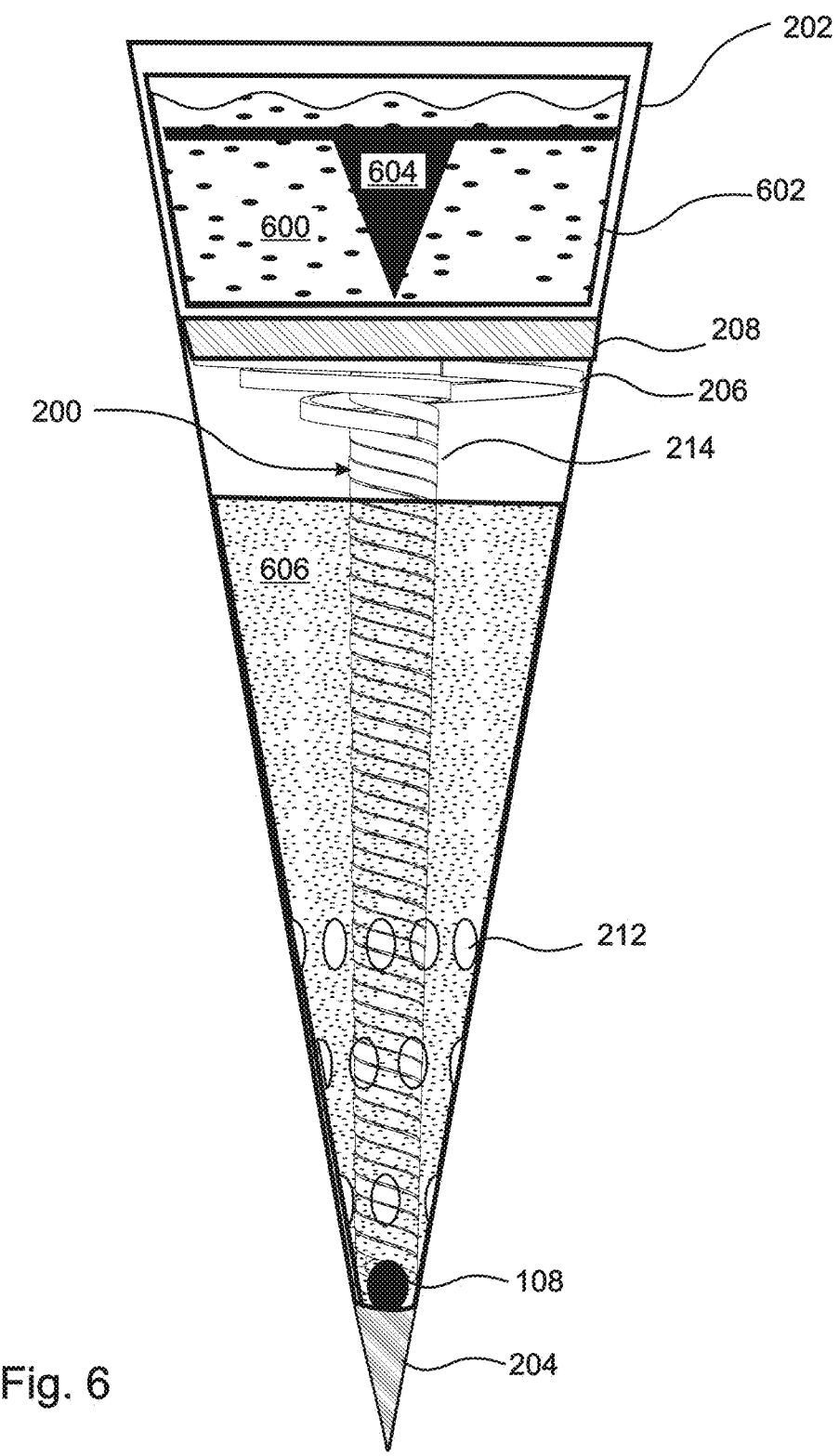
FIG. 6 is a side view of an embodiment of the present invention that includes water in a frangible hydration container within the tapered projectile.

With reference to FIG. 6, embodiments of the present invention include a reservoir of water 600 that is preinstalled in the projectile 202 and enclosed within a frangible hydration container 602, such as a thin-walled glass container, that releases its contents onto the seed carrier 200 upon impact of the projectile 202 with the ground 102, 104. In some of these embodiments, the frangible container is broken simply by the shock of the impact of the projectile 202 with the ground. In the illustrated embodiment, a weighted and pointed "hammer" 604 is included within the hydration container 602, and is configured to strike and break the bottom wall of the frangible hydration container 602 upon the impact of the projectile 202 with the ground.

As is also illustrated in FIG. 6, embodiments include nutrients, soil, sand, gravel, and/or fertilizer 606 within the projectile 202 surrounding the helix 214, which are absorbed into the surrounding soil upon exposure to water, and thereby support the germination of the seed 108. In various embodiments, a super-absorbent polymer (SAP) is included in the projectile 202 surrounding the helix 214, either alone or together with the nutrients and/or fertilizer 606. The SAP absorbs water when it is abundant within the tapered projectile 202, such as after a heavy rain, a flood, and/or release of water 600 from an internal reservoir container 602 (if present). The SAP then slowly releases the water over time when it is needed, thereby ensuring a continued application of water as the helix 200 unwinds, and then as the seed 108 germinates and grows.

While the top 206 of the seed carrier 200 is illustrated, and often referred to, herein as being a "spiral," it will be understood that the functionality of the seed carrier 200 arises primarily from its helix 214, and not from its top 206, and that the top 206 of the seed carrier can be an annulus, a disk, or any other construction that can be restrained from moving upward through the projectile 202. Similarly, the projectile 202 is illustrated, and sometimes referred to herein, as a "cone." However, it will be understood that the projectile 202 need not be conical, and can take on any tapered shape that includes a top and a bottom, such as an inverted pyramid, wherein a cross-sectional area of the top is larger than a cross-sectional area of the bottom.

Figure 7:
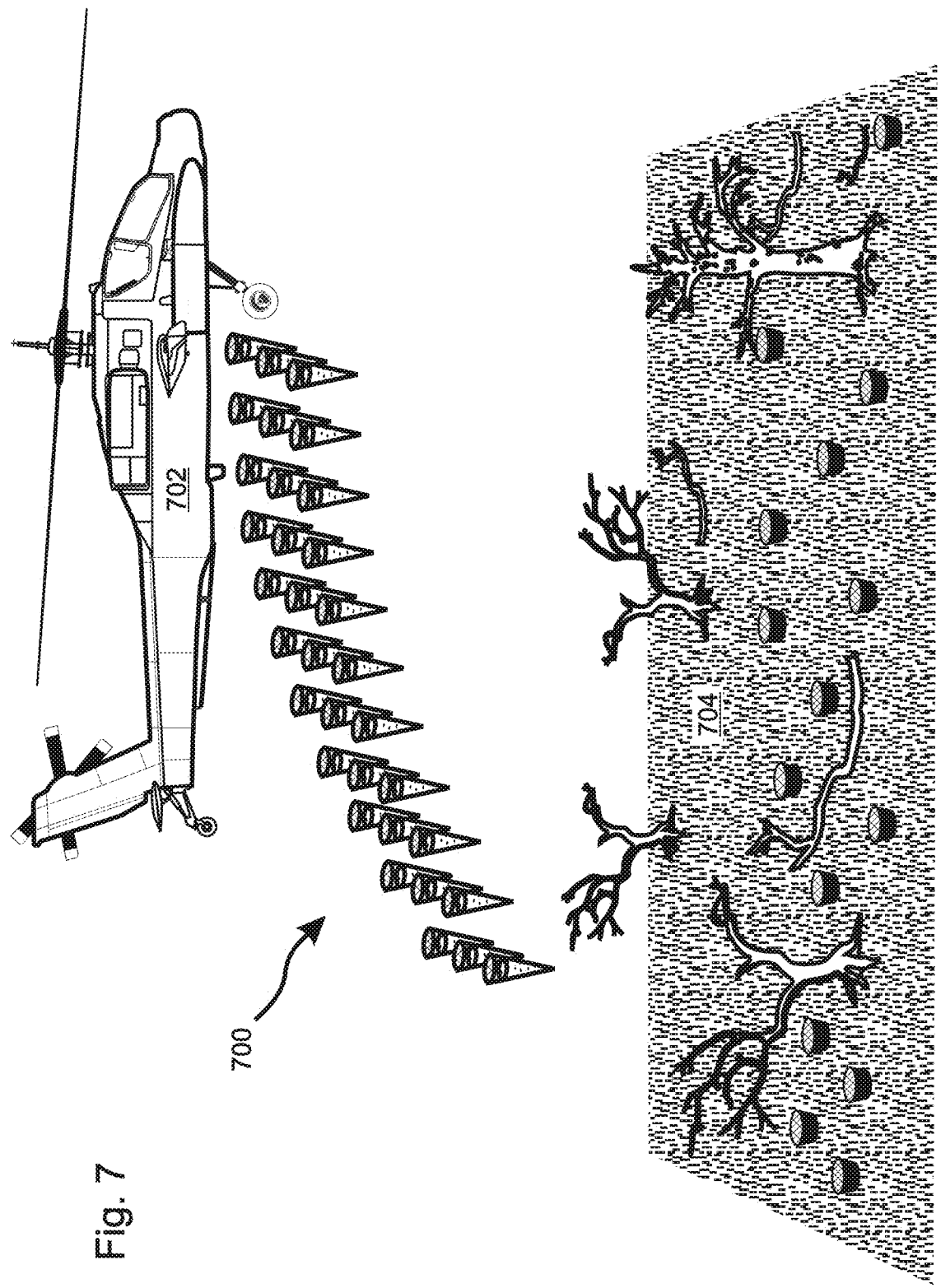
FIG. 7 illustrates a helicopter dropping, or ballistically propelling, a plurality of the disclosed seed planting devices onto a damaged, remote area, according to a method embodiment of the present invention.

With reference to FIG. 7, the disclosed method of establishing new vegetation in a distressed, remote area 704 includes dropping, or ballistically propelling, from the air onto the remote area 704 a plurality 700 of tapered projectiles 202 containing self-burying seed carriers 200, as disclosed herein.

The projectiles 202 can be dropped from any convenient aircraft, such as from one or more drones, balloons, airplanes, or, as illustrated in FIG. 7, by a helicopter 702. In some embodiments, the impact energy of the tapered projectiles 202 with the ground is derived entirely from gravitational acceleration, while in other embodiments the impact energy is augmented by ballistic propulsion applied, for example, by at least one of a compressed gas and a chemical explosive. In embodiments, if the remote area 704 has experienced a forest fire, the tapered projectiles 202 are dropped from a sufficient height, and/or ballistically propelled with sufficient force, to cause the tapered projectiles 700 to penetrate through any hydrophobic layer 102 that may have formed on top of the underlying soil 104.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:
1. A seed planting device comprising:
  a hollow tapered projectile having a top, a bottom, and a side, wherein a horizontal, cross-sectional area of the top is larger than a horizontal, cross-sectional area of the bottom;

a seed carrier positioned within an interior of the hollow tapered projectile, the seed carrier comprising a helix extending downward from a carrier top of the seed carrier, the helix being substantially aligned with a central axis of the hollow tapered projectile, the helix being made from a material that expands when exposed to water, thereby at least partially unwinding the helix and increasing a length thereof; and one or more seeds, seedlings, and saplings contained within the hollow tapered projectile and fixed to, or within, a lower portion of the helix;

the seed planting device being configured such that, upon an impact of the hollow tapered projectile with underlying ground, the bottom of the hollow tapered projectile is inserted into the ground, and the helix is exposed to moisture, thereby causing the length of the helix to be increased, such that the helix extends downward through the bottom of the hollow tapered projectile, and the one or more seeds, seedlings, and saplings are inserted into soil beneath the hollow tapered projectile.

2. The seed planting device of claim 1, wherein the carrier top extends laterally beyond a diameter of the helix.

3. The seed planting device of claim 1, wherein the carrier top comprises at least one spiral.

4. The seed planting device of claim 1, wherein the helix comprises a plurality of parallel sub-helices that are spaced vertically apart and wound together to form the helix.

5. The seed planting device of claim 1, wherein the hollow tapered projectile is shaped as a cone, or as a frustum of a cone.

6. The seed planting device of claim 1, wherein the carrier top is prevented from moving upward within the interior of the hollow tapered projectile.

7. The seed planting device of claim 1, wherein the bottom of the hollow tapered projectile comprises a downward-facing opening through which the helix is able to extend as its length is increased.

8. The seed planting device of claim 1, wherein the bottom of the hollow tapered projectile is a downwardly directed cap made from a water-soluble material.

9. The seed planting device of claim 8, wherein the water-soluble material comprises at least one of carbon nano-tube reinforced poly-vinyl alcohol and fiberglass reinforced acrylic.

10. The seed planting device of claim 1, wherein the hollow tapered projectile comprises at least one opening that penetrates the side of the hollow tapered projectile, thereby enabling moisture proximate the side of the hollow tapered projectile to enter into the interior of the hollow tapered projectile.

11. The seed planting device of claim 1, wherein the hollow tapered projectile further comprises water enclosed within a hydration container within the interior of the hollow tapered projectile, the hydration container being configured to release the water onto the helix upon impact of the hollow tapered projectile with the ground.

12. The seed planting device of claim 11, wherein the hydration container is frangible, and configured to be broken open upon impact of the hollow tapered projectile with the ground.

13. The seed planting device of claim 12, wherein the hollow tapered projectile further comprises a hammer configured to strike and break open the hydration container upon impact of the hollow tapered projectile with the ground.

14. The seed planting device of claim 1, further comprising at least one anchor extending outward from the hollow tapered projectile, the at least one anchor being configured to readily penetrate into the ground, and thereafter to resist any upward dislodging of the hollow tapered projectile from the ground.

15. The seed planting device of claim 1, further comprising at least one of nutrients, soil, sand, gravel, fertilizer, and super-absorbent polymer (SAP) within the interior of the hollow tapered projectile.

16. The seed planting device of claim 1, wherein the seed carrier is made from a biodegradable material.

17. A method of aerially applying seeds and/or seedlings to ground within a terrain, the method comprising:
    providing a seed planting device according to claim 1; and
    dropping or propelling the seed planting device from an aircraft toward the ground, such that:
        the bottom of the hollow tapered projectile of the seed planting device impacts the ground according to an impact energy;
        the bottom of the hollow tapered projectile of the seed planting device penetrates into the ground;
        the helix of the seed carrier positioned within the hollow tapered projectile is exposed to moisture;
        the length of the helix is increased;
        the helix extends downward through the bottom of the hollow tapered projectile; and
        the one or more seeds, seedlings, and saplings that are fixed to or within a lower portion of the helix is inserted into soil beneath the hollow tapered projectile.

18. The method of claim 17, wherein the impact energy of the seed planting device is derived entirely from gravitational acceleration after being released from the aircraft.

19. The method of claim 17, wherein dropping or propelling the seed planting device from the aircraft comprises ballistically propelling the seed planting device from the aircraft toward the forest floor.

20. The method of claim 17, wherein the impact energy is sufficient to cause the hollow tapered projectile to penetrate a hydrophobic layer into underlying soil.

* * * * *